US010993461B1

(12) United States Patent
Patel

(10) Patent No.: US 10,993,461 B1
(45) Date of Patent: May 4, 2021

(54) SYSTEMS AND METHODS FOR PRODUCING PORK RINDS

(71) Applicant: EVANS FOOD GROUP LTD., Chicago, IL (US)

(72) Inventor: Bhavesh Narendrabhai Patel, Des Plaines, IL (US)

(73) Assignee: Evans Food Group Ltd., Chicago, IL (US)

( * ) Notice: Subject to any disclaimer, the term of this patent is extended or adjusted under 35 U.S.C. 154(b) by 0 days.

(21) Appl. No.: 16/817,035

(22) Filed: Mar. 12, 2020

Related U.S. Application Data

(60) Provisional application No. 62/938,095, filed on Nov. 20, 2019.

(51) Int. Cl.
*A23L 13/20* (2016.01)
*A22C 17/00* (2006.01)

(52) U.S. Cl.
CPC .......... *A23L 13/20* (2016.08); *A22C 17/0093* (2013.01)

(58) Field of Classification Search
CPC .................................. A23L 1/31; A23L 13/20
See application file for complete search history.

(56) References Cited

U.S. PATENT DOCUMENTS

| | | | | |
|---|---|---|---|---|
| 3,725,084 A | * | 4/1973 | Rydeski et al. ....... | A22C 17/002 426/445 |
| 3,793,467 A | * | 2/1974 | Bundus ................... | A23P 30/34 426/445 |
| 3,846,572 A | * | 11/1974 | Nonaka ..................... | A23L 5/11 426/429 |
| 4,119,742 A | * | 10/1978 | Stupec .................... | A23L 13/20 426/104 |
| 4,163,804 A | | 8/1979 | Meyer | |
| 4,262,028 A | | 4/1981 | Meyer | |
| 4,270,486 A | * | 6/1981 | Leverenz ................. | A21C 9/04 118/24 |
| 6,033,715 A | | 3/2000 | Scott | |
| 2016/0073670 A1 | | 3/2016 | Rodriguez | |
| 2017/0238588 A1 | | 8/2017 | Velasco Alvarez | |

* cited by examiner

*Primary Examiner* — Jenna A Watts
(74) *Attorney, Agent, or Firm* — Avant Law Group, LLC

(57) ABSTRACT

A system has rendering tanks, a polishing tank, and a conveyor associated with the rendering tanks and the polishing tank. A batch rendering method for producing pork rinds with the system includes: (a) loading a first batch of pork skins into the rendering tanks; (b) cooking the first batch of pork skins inside the rendering tanks; (c) unloading the first batch of pork skins from each of the rendering tanks into the conveyor; (d) transporting the first batch of pork skins to the polishing tank; (e) loading the first batch of pork skins into the polishing tank; (f) tumbling the first batch of pork skins within the polishing tank; (g) loading a second batch of pork skins into the rendering tanks; and (h) cooking the second batch of pork skins inside the rendering tanks. Steps (f) and (h) occur at the same time.

6 Claims, 4 Drawing Sheets

SYSTEMS AND METHODS FOR PRODUCING PORK RINDS

CROSS REFERENCE TO RELATED APPLICATIONS

This application claims priority to U.S. provisional application 62/938,095, filed Nov. 20, 2019, the disclosure of which is incorporated by reference herein in its entirety.

FIELD OF THE DISCLOSURE

The disclosure relates generally to the field of food production processes. More specifically, the disclosure relates to systems and methods for producing pork rinds.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

In an embodiment, a batch rendering method for producing pork rinds with a system is provided. The system has a plurality of rendering tanks, a polishing tank, and a conveyor, and the conveyor is associated with the plurality of rendering tanks and the polishing tank. The method includes steps: (a) loading a first batch of pork skins into the plurality of rendering tanks; (b) cooking the first batch of pork skins inside the plurality of rendering tanks; (c) unloading the first batch of pork skins from each of the plurality of rendering tanks into the conveyor; (d) transporting the first batch of pork skins to the polishing tank; (e) loading the first batch of pork skins into the polishing tank; (f) tumbling the first batch of pork skins within the polishing tank; (g) loading a second batch of pork skins into the plurality of rendering tanks; and (h) cooking the second batch of pork skins inside the plurality of rendering tanks. Steps (f) and (h) occur at the same time.

In another embodiment, a batch rendering method for producing pork rinds with a system is provided. The system has a plurality of rendering tanks, a polishing tank, and a conveyor, and the conveyor is associated with the plurality of rendering tanks and the polishing tank. The method includes steps: (a) loading a first batch of pork skins into the plurality of rendering tanks; (b) cooking the first batch of pork skins inside the plurality of rendering tanks with a first medium; (c) unloading the first batch of pork skins and the first medium from each of the plurality of rendering tanks into the conveying device; (d) transporting the first batch of pork skins to the polishing tank; (e) draining the first medium with a drainage system of the conveying device; (f) loading the first batch of pork skins into the polishing tank; (g) tumbling the first batch of pork skins within the polishing tank; (h) loading a second batch of pork skins into the plurality of rendering tanks; and (i) cooking the second batch of pork skins inside the plurality of rendering tanks with a second medium. Steps (d) and (e) occur at the same time, and steps (g) and (i) occur at the same time.

In yet another embodiment, a batch rendering method for producing pork rinds with a system is provided. The system has a first rendering tank, a second rendering tank, a polishing tank, and a conveyor associated with the first rendering tank, the second rendering tank, and the polishing tank. The method includes steps: (a) loading a first part of a first batch of pork skins into the first rendering tank; (b) loading a second part of the first batch of pork skins into the second rendering tank; (c) cooking the first part of the first batch of pork skins inside the first rendering tank with a first medium; (d) cooking the second part of the first batch of pork skins inside the second rendering tank with a second medium; (e) unloading the first part of the first batch of pork skins from the first rendering tank into the conveyor; (f) unloading the second part of the first batch of pork skins from the second rendering tank into the conveyor; (g) transporting the first part and the second part of the first batch of pork skins to the polishing tank; (h) loading the first part and the second part of the first batch of pork skins into the polishing tank; and (i) tumbling the first part and the second part of the first batch of pork skins within the polishing tank. Step (b) begins after step (a) begins, step (d) begins after step (c) begins, and step (f) begins after step (e) begins.

BRIEF DESCRIPTION OF THE SEVERAL VIEWS OF THE DRAWINGS

Illustrative embodiments of the present disclosure are described in detail below with reference to the attached drawing figures.

DETAILED DESCRIPTION

Figure 1:
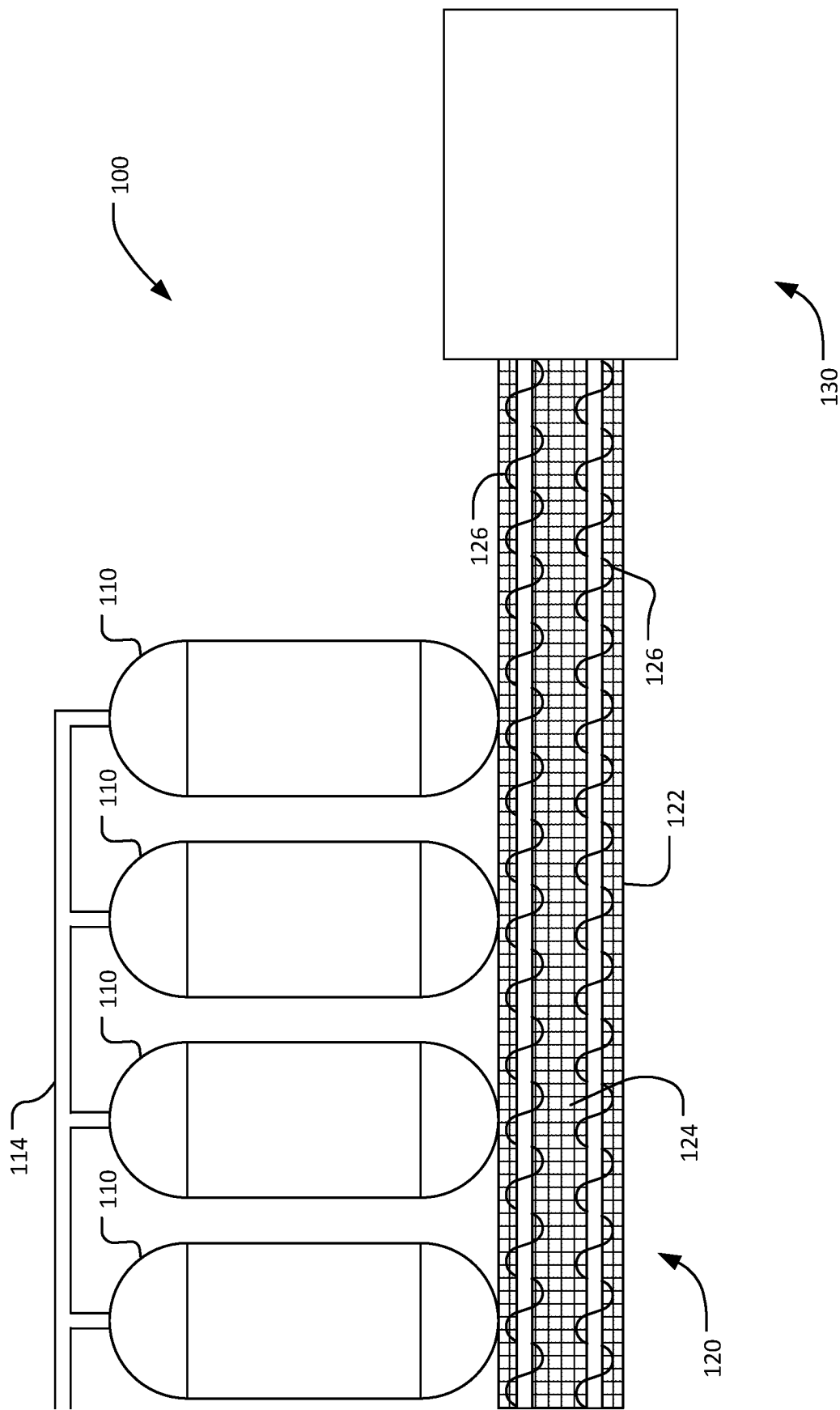
FIG. 1 is a schematic view of a batch rendering system, according to an embodiment.

Systems and methods for producing pork rinds are known in the art. These conventional methods typically begin upon delivery of the pork skins (e.g., pork belly skins) by vehicle or other method. The pork skins (also sometimes referred to as "pellets") are either pre-processed or processed on site, which may include dicing the skins into a suitable size and shape. The pork skins are then rendered to remove fat and moisture. The processed pork skins are then placed into a fryer that is loaded with a hot frying oil (e.g., peanut oil, vegetable oil, lard, et cetera) to puff up and crisp the pork skins into the pork rind product.

The rendering process typically takes a substantial amount of time to complete, making up a significant portion of the time required to complete the overall pork rind manufacturing process. A conventional rendering process may, for example, consist of loading the skins (collectively referred to as a "batch") into a tank with oil, and cooking the skins at a relatively low temperature where the pork skins will not crisp. The skins may additionally be cooked with steam. Then the skins are tumbled in the oil, which is subsequently drained from the tank. After the oil is drained, the skins are tumbled within the tank (e.g., via one or more paddles within the tank), thus further separating out the fat from the pork skins (referred to as "polishing" the skins). The pork skins are then unloaded from the tank and are ready for further pork rind preparation, such as puffing, crisping, and seasoning.

Overall, the conventional rendering process may take about 5½ or so hours to completely render a batch of pork skins. This batch time requirement severely limits the number of batches that can be rendered in a typical work day, thus reducing the efficiency—and increasing the cost—of the pork rendering process. While this limitation can be somewhat mitigated by running multiple batches in multiple tanks at the same time, doing so does not improve the batch time requirement of each individual batch and requires multiple personnel to operate. The conventional method requires each tank to completely render and polish a batch of pork skins before being loaded with the next batch, which slows down the process significantly. The batch rendering method described herein may remedy these issues at least in part.

FIGS. 1 and 2B through 4 depict a batch rendering method 200 and associated batch system 100, according to an embodiment. The batch system 100 may include a plurality of rendering tanks 110, a conveyor 120, and a polishing tank 130. In use, the batch rendering method 200 may render fat from a plurality of batches (sometimes referred to herein as a set of batches) of pork skins simultaneously while reducing the overall batch time requirement.

The plurality of rendering tanks 110 are configured for cooking pork skins, or other skins, in oil or other mediums. In some embodiments, the tanks 110 may alternately or additionally be configured to use steam to heat the pork skins. The tanks 110 may be coupled to a drainage pipe 114 for the removal of some or all of the fat rendered from the pork skins. The removed fat may then be directed elsewhere to be recycled or reused. Alternately or additionally, the rendering tanks 112 may be configured to unload both the pork skins and the medium onto the conveyor 120. Conversely, the conventional systems may leave the rendered pork skins in the rendering tank, draining away the rendered fluids and commencing polishing as previously described. Because the pork skins in the method 200 are offloaded from the rendering tanks 110 to be polished elsewhere, the tanks 110 are allowed to prepare subsequent batches of pork skins. For instance, while a first batch 10 (FIG. 2B) is being moved to and polished by the polishing tank 130, a second batch of skins 20 (FIG. 2B) may be loaded into the rendering tanks 110 to begin the rendering process. In other words, the batch rendering system 100 described herein may allow for multiple batches of pork skins to be more efficiently processed simultaneously (relative to prior art systems).

The conveyor 120 may be configured to transport the pork skins from the rendering tanks 110 to the polishing tank 130, where a set of pork skin batches may be consolidated and polished. For example, the conveyor 120 may include an auger or screw conveyor (FIG. 1), as described in further detail below, that connects each of the plurality of tanks 110 to the polishing tank 130. In some embodiments, there are a plurality of conveyors 120 that move the pork skins from the rendering tanks 110 to one or more polishing tanks 130 (e.g., there may be a ratio of rendering tanks 110 to conveyors 120 to polishing tanks 130 of 1:1:1, 2:1:1, 2:2:1, 3:1:1, 1:3:1, 3:3:1, 5:1:1, et cetera). In other words, there may be any suitable number of conveyors 120 for consolidating the pork skins from the rendering tanks 110 in the polishing tank(s) 130.

The conveyor 120 may include a body 122 (e.g., a chute, a funnel, etc.) with one or more drainage systems 124 to allow the fat, moisture, oil, and/or any other desired material to continue to separate from the pork skins as the skins are conveyed from the rendering tanks 110 to the polishing tank 130. The drainage system 124 may include a plurality of openings located in a surface of the conveyor 120 (e.g., a perforated screen) to allow the material to pass therethrough. In some embodiments, the conveyor 120 may include one or more transport devices 126 (e.g., stirring paddles, a screw or augur, etc.) configured to separate oil from the skins as they are conveyed from the rendering tanks 110 to the polishing tank 130. Alternately or additionally, the transport devices 126 may push the pork pellets to the polishing device 130. In some embodiments, it may be particularly desirable for the conveyor 120 to be arranged (e.g., angled) such that the pork skin batches gain elevation as they travel to the polishing tank 130.

In use, the conveyor 120 may perform several functions. The conveyor 120 may consolidate the pork skins from the rendering tanks 110, thus allowing the rendering tanks 110 to be prepared (e.g., by draining excess oil, cleaning, etc.) for the next batch of pork skins. Similarly, the conveyor 120 may consolidate oil from the rendering tanks 110, thus allowing the rendering tanks 110 to empty out faster than conventional rendering tanks. Furthermore, the drainage system 124 of the conveyor 120 may continue to separate undesirable materials (e.g., oil, fat, moisture) from the pork skins as they travel to the polishing tank 130. This may be an advantage over prior art systems which spend time performing further separation (e.g., centrifugal separation) on the pork skins before being able to handle the next batch.

The polishing tank 130 may be a tank configured to retain a plurality of batches of pork skins (e.g., the consolidated batches of the rendering tanks 110). The polishing tank 130 may be configured to perform centrifugal separation (e.g., via one or more internal paddles) on the consolidated batches of pork skins to complete the fat removal process. Once the process is completed, the pork skins may be removed from the polishing tank 130 for further processing (e.g., puffing, crisping, seasoning, et cetera). The separated materials may then be reused or recycled as desired.

The batch system 100 disclosed herein may provide several benefits over conventional rendering systems. First, the conveyor 120 may allow the rendering tanks 110 to be prepared (e.g., drained, cleaned, etc.) for the next batch of pork skins faster than conventional systems since the rendering tanks 110 no longer have to perform the polishing step themselves. Instead, the rendering tanks 110 may offload their respective batches into the conveyor 120 as soon as the pork skins have completed cooking in the oil (e.g., after about one hundred and twenty minutes). This may allow the rendering tanks 110 to prepare more batches of skins than conventional systems in a given time period. For example, rather than waiting for the rendering tanks 110 to complete a conventional polishing cycle (e.g., after about ninety minutes) before starting another batch, the rendering tanks 110 may instead be readied to receive another batch of skins while the preceding batch is processed by the conveyor 120 and/or the polishing tank 130. Thus, progress may be made for multiple pork skin batches at the same time. Compared to conventional batch rendering methods, embodiments of the batch rendering method 200 may process about twice as many pork skins in a given work day.

Additionally, the conveyor 120 allows further oil and cooked pellet separation of the skins while the batches are being consolidated into the polishing tank 130. Thus, the consolidated batches of cooked skins may require less time to be fully polished in the polishing tank 130 than a conventional system due to the increased friction available for fat layer removal.

Another consideration may be that a single crew typically fills and operates multiple conventional rendering tanks.

This means that the cycle times for each of these tanks are staggered from one another as the crew operates each tank one by one. These staggered cycles repeat as the work day continues, resulting in an inefficient use of time. Conversely, the batch rendering system 100 described herein may allow for the same crew to fill and operate the rendering tanks 110 in a more time efficient manner by consolidating the contents of the rendering tanks 110 for polishing. Overall, the batch rendering system 100 described herein may simultaneously prepare several batches of skins in less time than a conventional system (e.g., about two hundred and ninety minutes total hours per set of batches compared to about three hundred and sixty minutes, as shown in FIGS. 2A and 2B).

Figure 2A:
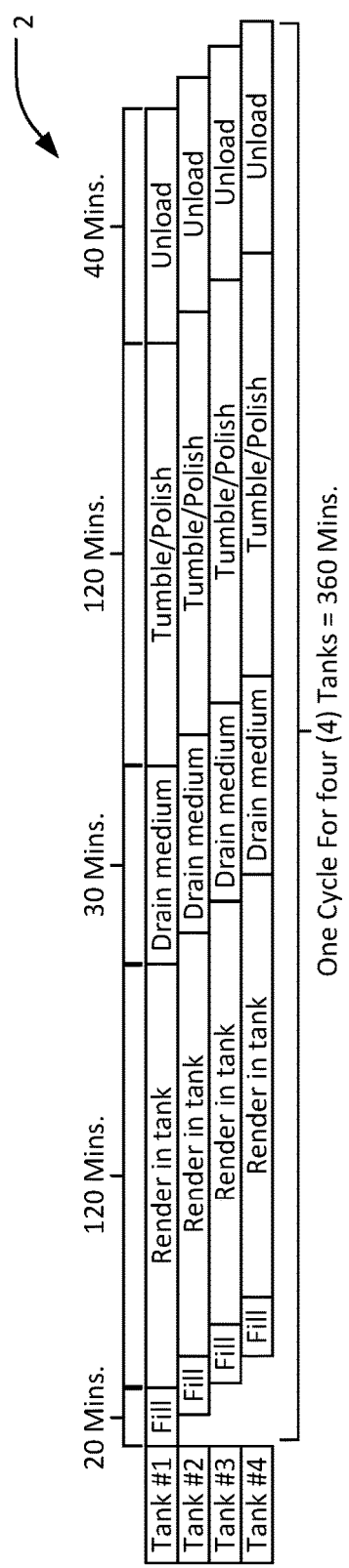
FIG. 2A is a schematic view of a timeline of a PRIOR ART batch rendering system.
Figure 2B:
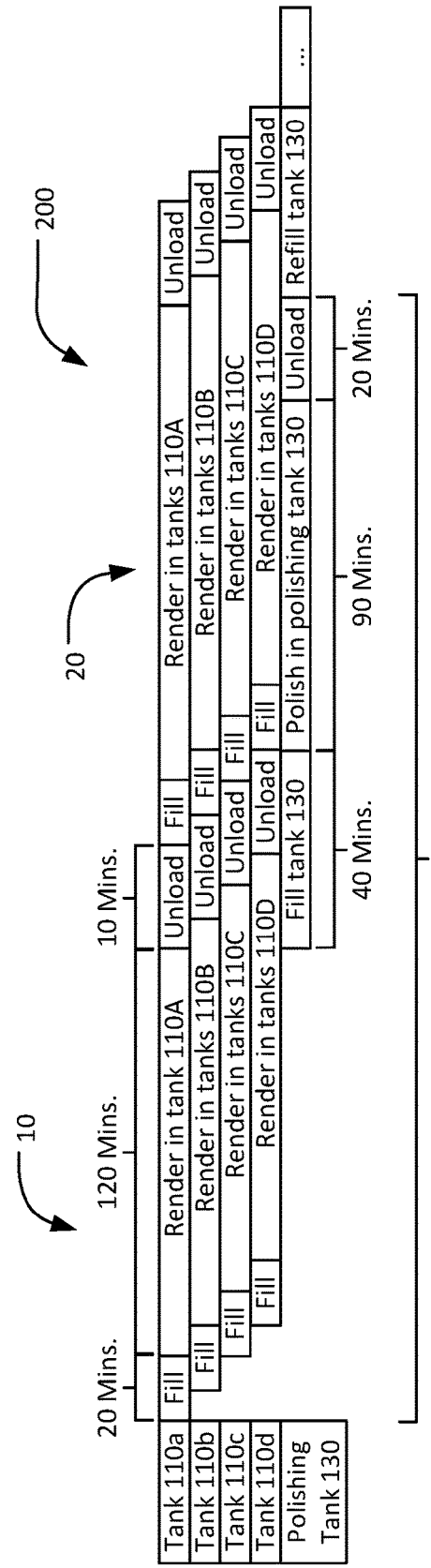
FIG. 2B is a schematic view of a timeline of the batch rendering system of FIG. 1.

FIGS. 2A and 2B illustrate an example comparison of process timelines between a conventional method 2 and the batch rendering method 200 described herein, according to an embodiment. FIG. 2A depicts four conventional tanks each undergoing one cycle of a conventional batch rendering method. Each batch is both rendered and polished in its own rendering tank. When staffed by a single crew operating multiple rendering tanks (e.g., four tanks), the start time for each batch is staggered (e.g., by ten minutes). In total, each batch of pork pellets may take about three hundred and thirty minutes to fully render and polish, where the batch is then ready for final processing (e.g., seasoning, packaging, et cetera). The conventional method may include the steps of filling a first rendering tank with a batch of pork skins and medium (about twenty minutes), rendering the batch in that tank (about one hundred and twenty minutes), draining the tank of the medium (about thirty minutes), tumbling/polishing the batch of pork skins (about one hundred and twenty minutes), and unloading the batch from the tank (about forty minutes; for a total of about three hundred and thirty minutes). To complete all four batches may take a total of roughly three hundred and sixty minutes. This process may be repeated for each tank or set of tanks, and each tank may process about four batches of pork skins during a given day (i.e., per twenty four hour period).

FIG. 2B shows a timeline for about one and a half cycles of the batch rendering method 200, according to an embodiment. Here, multiple tanks (e.g., tank 110A, tank 110B, tank 110C, tank 110D) are filled with pork pellets and medium (taking about twenty minutes). These pellets may make up the first batch or set of batches 10. The first batch 10 is then rendered in the rendering tanks 110 (about one hundred and twenty minutes), before being unloaded onto the conveyor (about ten minutes for each tank 110). The conveyor 120 then transports the pellets to the polishing tank 130. Unloading the rendering tanks 110 may at least partially overlap with loading the polishing tank 130, and the time required to transfer the batches from the rendering tanks 110 to the polishing tank 130 may be proportionate to the number of rendering tanks 110 in use. For example, transferring the contents of three tanks 110 to the polishing tank 130 may take less time than transferring the contents of four tanks 110. In the example shown in FIG. 2B, the four rendering tanks 110 may take about forty minutes to load into the polishing tank 130. After being loaded in the polishing tank 130, the first batch 10 undergoes polishing (taking about ninety minutes), and then unloading (taking about twenty minutes). Thereafter, the first batch 10 may undergo any other suitable pork rind finishing process, such as puffing, crisping, seasoning, packaging, et cetera.

While the first batch 10 is being completed in the polishing tank 130, a second batch 20 may begin processing. As shown in FIG. 2B, the second set of batches 20 may be loaded into each of the rendering tanks 110 after the first batch 10 is unloaded onto the conveyor 120. Thus, the second set of batches 20 may begin rendering in the rendering tanks 110 while the first batch 10 is loaded into the polishing tank 130 and/or while the first batch 10 polishes in the polishing tank 130. Once the first batch 10 has been unloaded from the polishing tank 130, the second batch 20 may be ready to be transferred to the polishing tank 130. The second batch 20 may then be polished in the polishing tank 130 while a third batch is loaded into the rendering tanks 110. Thus, each batch of pork skins (e.g., four tanks 110 worth of pork skins) may take about two hundred and ninety minutes to complete, which may allow, for example, eight batches to be completed in a twenty-four hour period. Because the entire polishing process (loading, polishing, and unloading taking about one hundred and fifty minutes) overlaps with a portion of the next batch's rendering process (loading, rendering, and unloading taking about one hundred and ninety minutes), more batches may be processed within a given time period relative to conventional methods.

Figure 3:
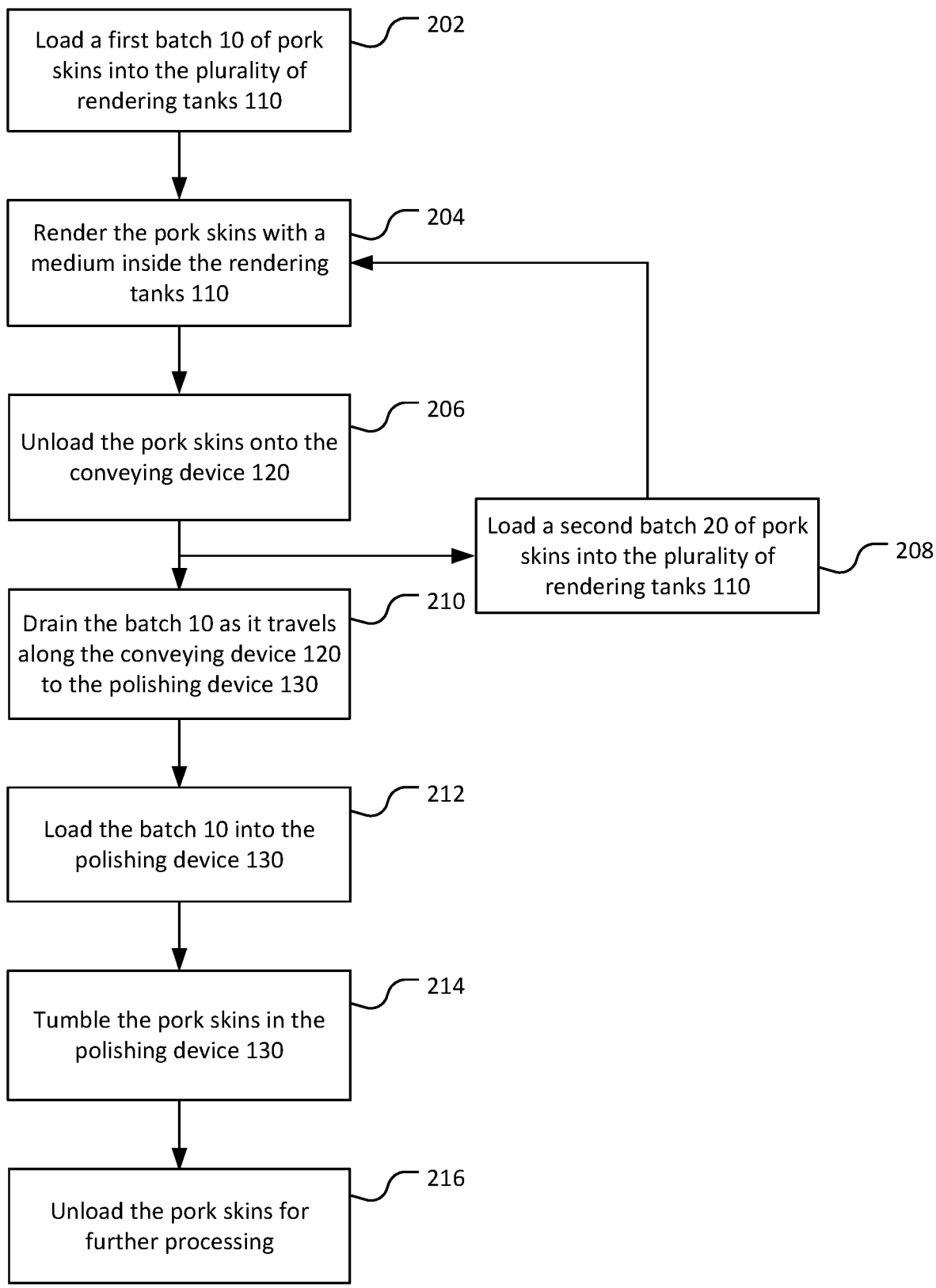
FIG. 3 is a flowchart illustrating a method for using the batch rendering system of FIG. 1, in an embodiment.

FIG. 3 is a flowchart that illustrates the method 200 for operating the various embodiments of the batch rendering system disclosed herein. First, at step 202, a first batch 10 of pork skins (e.g., the pellets) are loaded into the plurality of rendering tanks 110 (e.g., two, three, four, five, or more tanks), along with a suitable rendering medium (e.g., oil such as peanut oil or vegetable oil, lard, moisture, et cetera). Each of the rendering tanks 110 may be loaded, for example, in succession by a crew. In other embodiments, the rendering tanks 110 may be loaded generally at the same time (e.g., by multiple crews or operators). At step 204, the rendering tanks 110 may render their contents until the render cycle is complete (e.g., about one hundred and twenty minutes). Then, at step 206, the medium and the pork skins are off-loaded from the rendering tanks 110 to the conveyor 120. After the rendering tanks 110 are emptied of their contents, at step 208, the rendering tanks 110 may be loaded with the next batch (e.g., a second batch 20) of pork pellets and medium. This second batch 20 may begin rendering inside the rendering tanks 110 (i.e., the second batch 20 may undergo step 204).

At step 210, the first batch 10 may travel along the conveyor 120 to be taken to the polishing tank 130. While traveling, the drainage system 124 may continue to drain away excess material (e.g., rendered fat, moisture, oil, etc.) from the first batch 10. At step 212, the first batch 10 may be loaded into the polishing tank 130. Then, at step 214, the first batch 10 may be tumbled within the polishing tank 130 to complete the polishing process. Note that while the first batch 10 is being polished, the second batch 20 may be rendering in the rendering tanks 110. In other words, the two batches 10 and 20 may be contemporaneously undergoing various steps of the method 200. By the time the second batch 20 is ready to be loaded into the polishing tank 130 (i.e., the second batch 20 has completed steps 204, 206, and 210), the first batch 10 may have completed the polishing process and been subsequently unloaded from the polishing tank 130. Another batch (e.g., a third batch) may begin batch rendering after the second batch 20 is loaded onto the conveyor 120, similar to how the second batch 20 was started after the first batch 10. This process may repeat for as many batches as is desirable.

The batch rendering method 200 described above may have steps omitted, modified, or added to, in various embodiments. For example, the polishing tank 130 may be configured to continuously polish the skins (e.g., there may be a continuous or intermittent feed of skins from the rendering tanks 110 and the conveyor 120 to be polished in the polishing tank 130). As another example, the batch rendering method may include the step of reusing/recycling the medium (e.g., steam, oil, lard, etc.) and/or the materials rendered (e.g., fat) from the rendering process.

Figure 4:
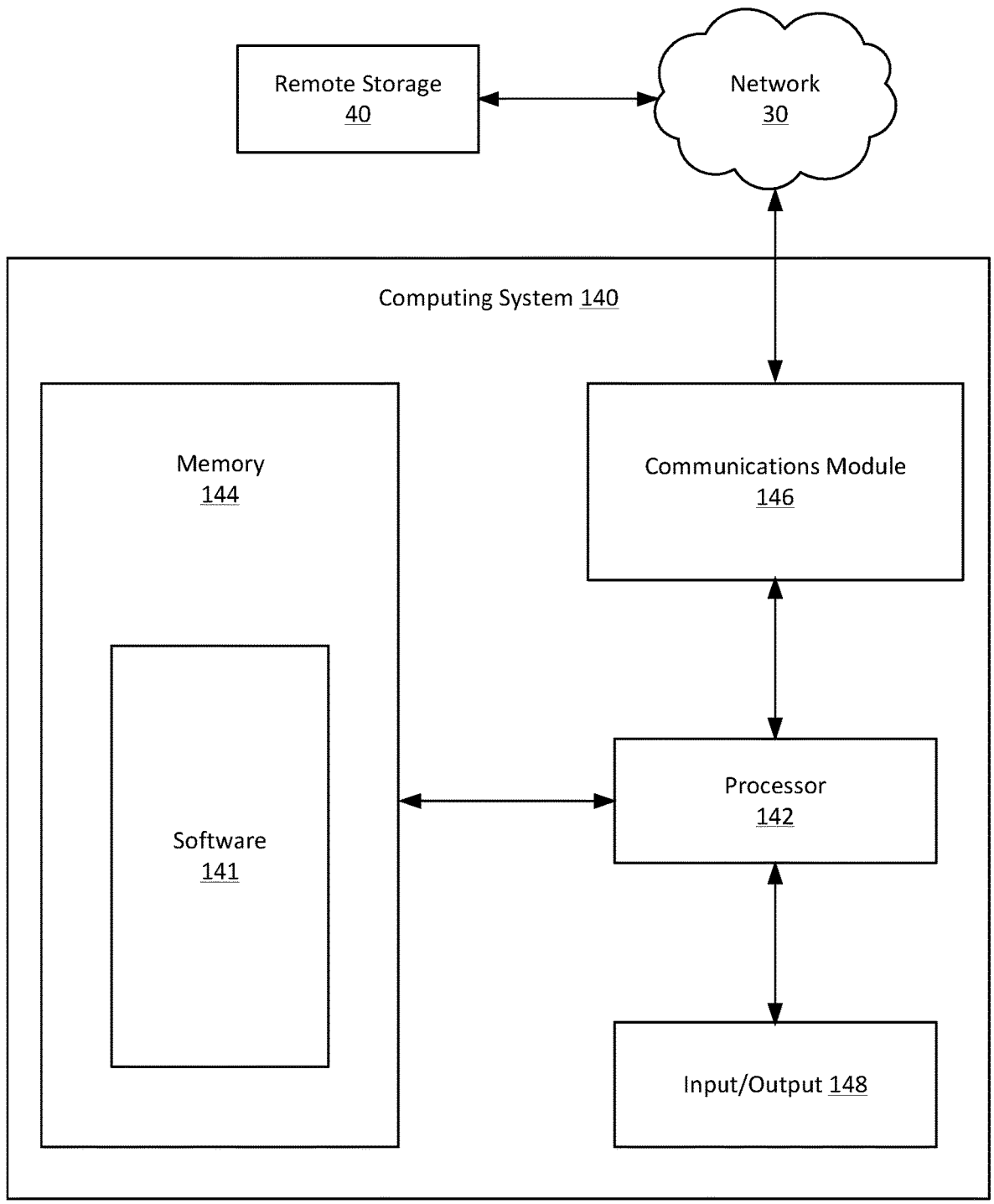
FIG. 4 shows a block diagram of a computing system of the batch rendering system of FIG. 1.

FIG. 4 is a functional block diagram of the computing system 140 which may be used to implement the various batch rendering system and method embodiments according to the different aspects of the invention. The computing system 140 may be incorporated with the batch system 100 (e.g., with the rendering tanks 110, the conveyor 120, the polishing tank 130), and/or the computing system 140 may be located within an external computing device (e.g., a controller, a phone, a desktop computer, a laptop computer, et cetera). The computing system 140 may be, for example, a smartphone, a laptop computer, a desktop computer, a flexible circuit board, or other computing device whether now known or subsequently developed. The computing unit 140 comprises a processor 142, a memory 144, a communication module 146, and an Input/Output 148. The processor 142 may include any processor used in computing devices, including a digital or analog processor (e.g., a Nano carbon-based processor). In certain embodiments, the processor 142 may include one or more other processors, such as one or more microprocessors, and/or one or more supplementary co-processors, such as math co-processors.

The memory 144 may include both operating memory, such as random access memory (RAM), as well as data storage, such as read-only memory (ROM), hard drives, optical, flash memory, or any other suitable memory/storage element. The memory 144 may include removable memory elements, such as a CompactFlash card, a MultiMediaCard (MMC), and/or a Secure Digital (SD) card. In certain embodiments, the memory 144 includes a combination of magnetic, optical, and/or semiconductor memory, and may include, for example, RAM, ROM, flash drive, and/or a hard disk or drive. The processor 142 and the memory 144 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 142 may be connected to the memory 144 via the Input/Output 148.

The communication module 146 may be configured to handle communication links (e.g., wired and/or wirelessly) between the computing system 140 and other external devices or receivers and to route incoming/outgoing data appropriately. For example, inbound data from the Input/Output 148 may be routed through the communication module 146 before being directed to the processor 142, and outbound data from the processor 142 may be routed through the communication module 146 before being directed to the Input/Output 148. The communication module 146 may include one or more transceiver modules configured for transmitting and receiving data, and using, for example, one or more protocols and/or technologies, such as wires, Bluetooth, GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology for communicating with other components, such as through a network 30.

The Input/Output 148 may be any type of connector used for physically interfacing with a smartphone, computer, keyboard, mouse, and/or other devices, such as a USB or mini-USB port. In other embodiments, the Input/Output 148 may include multiple communication channels for simultaneous communication with, for example, other processors, servers, and/or client terminals. In still some embodiments, the Input/Output 148 is a power switch for controlling the flow of electricity to other components of the computing system 140.

The memory 144 may store instructions for communicating with other systems, such as a computer. The memory 144 may store, for example, a program (e.g., computer program code) adapted to direct the processor 142 in accordance with the present embodiments. The instructions also may include program elements, such as an operating system. While execution of sequences of instructions in the program causes the processor 142 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 144 may include software 141. The software 141 may contain machine readable instructions configured to be executed by the processor 142. The software 141 may, for example, execute a program to automatically control the batch rendering system 100, automatically detect and adjust rendering/polishing conditions of the rendering system 100, et cetera.

The computing system 140 may be in data communication with the network 30. The network 30 may be a wired network, a wireless network (e.g., Bluetooth, GSM, UMTS (3GSM), IS-95 (CDMA one), IS-2000 (CDMA 2000), LTE, FDMA, TDMA, W-CDMA, CDMA, OFDMA, Wi-Fi, WiMAX, etc.), or comprise elements of both. The computing system 140 may be in data communication with a remote storage 40 (e.g., a remote data storage) through the network 30.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the present disclosure. Not all steps listed in the various figures need be carried out in the specific order described.

The disclosure claimed is:

1. A batch rendering method for producing pork rinds with a system; the system comprising a plurality of rendering tanks, a polishing tank, and a conveyor; the conveyor being associated with the plurality of rendering tanks and the polishing tank; the method comprising:
 (a) loading a first batch of pork skins into the plurality of rendering tanks;
 (b) cooking the first batch of pork skins inside the plurality of rendering tanks with a first medium;
 (c) unloading the first batch of pork skins and the first medium from each of the plurality of rendering tanks into the conveyor;
 (d) transporting the first batch of pork skins to the polishing tank via the conveyor;

(e) draining the first medium with a drainage system of the conveyor;
(f) loading the first batch of pork skins into the polishing tank;
(g) tumbling the first batch of pork skins within the polishing tank;
(h) loading a second batch of pork skins into the plurality of rendering tanks; and
(i) cooking the second batch of pork skins inside the plurality of rendering tanks with a second medium;
wherein:
  steps (d) and (e) occur at the same time; and
  steps (g) and (i) occur at the same time.

2. The method of claim 1, wherein the drained first medium is recycled.

3. The method of claim 1, wherein the first medium and the second medium are oil.

4. The method of claim 1, wherein the first medium and the second medium are steam.

5. The method of claim 1, wherein steps (a) and (c) are performed in a staggered manner for each of the plurality of rendering tanks.

6. The method of claim 1, wherein a time required to perform step (f) is proportionate to a number of the plurality of rendering tanks.

* * * * *